Dec. 10, 1968  J. H. DE FREES  3,415,486

SPRING BIASED TANK OUTLET VALVE

Filed May 25, 1966

INVENTOR
JOSEPH H. DE FREES
BY
Baldwin, Doran & Egan
ATTORNEYS

United States Patent Office 3,415,486
Patented Dec. 10, 1968

3,415,486
SPRING BIASED TANK OUTLET VALVE
Joseph H. De Frees, Warren, Pa., assignor to
Anne S. De Frees, Warren, Pa.
Filed May 25, 1966, Ser. No. 552,873
5 Claims. (Cl. 251—63.6)

ABSTRACT OF THE DISCLOSURE

A fluid storage tank outlet valve disposed at the bottom of the tank, exteriorly thereof, and including a valve disc which closes against the flow of the stored product. The valve is removable exteriorly of the tank, with all parts in contact with the product being readily accessible. The valve disc is hydraulically controlled and is biased to a normally closed position, thereby providing a fail-safe feature on inadvertent failure of the hydraulic pressure. The valve hydraulic fluid control system is formed completely separate from the tank outlet flow system, thus preventing intermingling of the two liquids.

---

This invention relates to valves and more particularly to discharge or outlet valves used in connection with tanks or containers for the storage or transportation of liquids.

The outlet opening of liquid storage or transportation tanks handling certain chemicals and flammable liquids must be provided with a simple, efficient safety valve, preferably remotely controlled by pressurized hydraulic fluid. In such valves, there cannot be any intermingling of the hydraulic fluid and the fluid product being hauled in the tank. Not only would any such intermingling be highly dangerous, but could be most objectionable from a contamination standpoint. Also, for highest efficiency, the valve must close against the flow of the stored product, in coaction with a fail-safe feature wherein bias means are provided to retain the valve in a normally-closed position. Additionally, the valve must be readily removable from the tank exterior whereby all parts in contact with the product are readily accessible.

Therefore, it is an object of the invention to provide a liquid storage tank outlet valve which closes against the flow of the stored liquid product.

A further object of the invention is to provide a valve of the above type that is controlled by pressurized hydraulic fluid wherein there is no intermingling of the hydraulic fluid and the product being hauled in the tank.

A further object of the invention is to provide a valve of the above type having a fail-safe feature wherein the valve is disposed in normally-closed position when not in use.

A further object of the invention is to provide a valve of the above type removable from operative position exteriorly of the tank.

A further object of the invention is to provide a valve of the above type that is simple in construction, inexpensive to manufacture, and highly effective in operation.

Briefly, the foregoing objects are accomplished by the provision of a liquid storage tank outlet valve wherein the valve seat is formed on the periphery of the tank outlet port and faces outwardly of the tank. The valve includes a valve disc selectively engageable with the valve seat from the exterior of the tank whereby the disc closes the outlet port against the flow of stored fluid flowing therethrough. The valve extends substantially exteriorly of the tank and contains means for detachably securing the valve to the tank exterior. Thus, the valve can be readily removed from the tank exterior and cleaned, all parts in contact with the product being readily accessible.

A suitable bias means is provided to retain the valve disc in normally-closed position against the valve seat. This fail-safe feature biases the valve to closed position if hydraulic pressure is interrupted by any of the following:

(1) The failing of a fusible plug in the hydraulic system;

(2) The rupturing of the hydraulic system due to accident or other means; and (3) The deliberate manual releasing of the hydraulic pressure at some remote point on the tank.

The valve also features a complete separation of the pressurized hydraulic fluid system from the tank outlet flow system of the stored product, such feature clearly preventing any intermingling of the two liquids.

Other objects and advantages of the invention will be apparent from the following description taken in conjunction with the drawings wherein.

Figure 1:
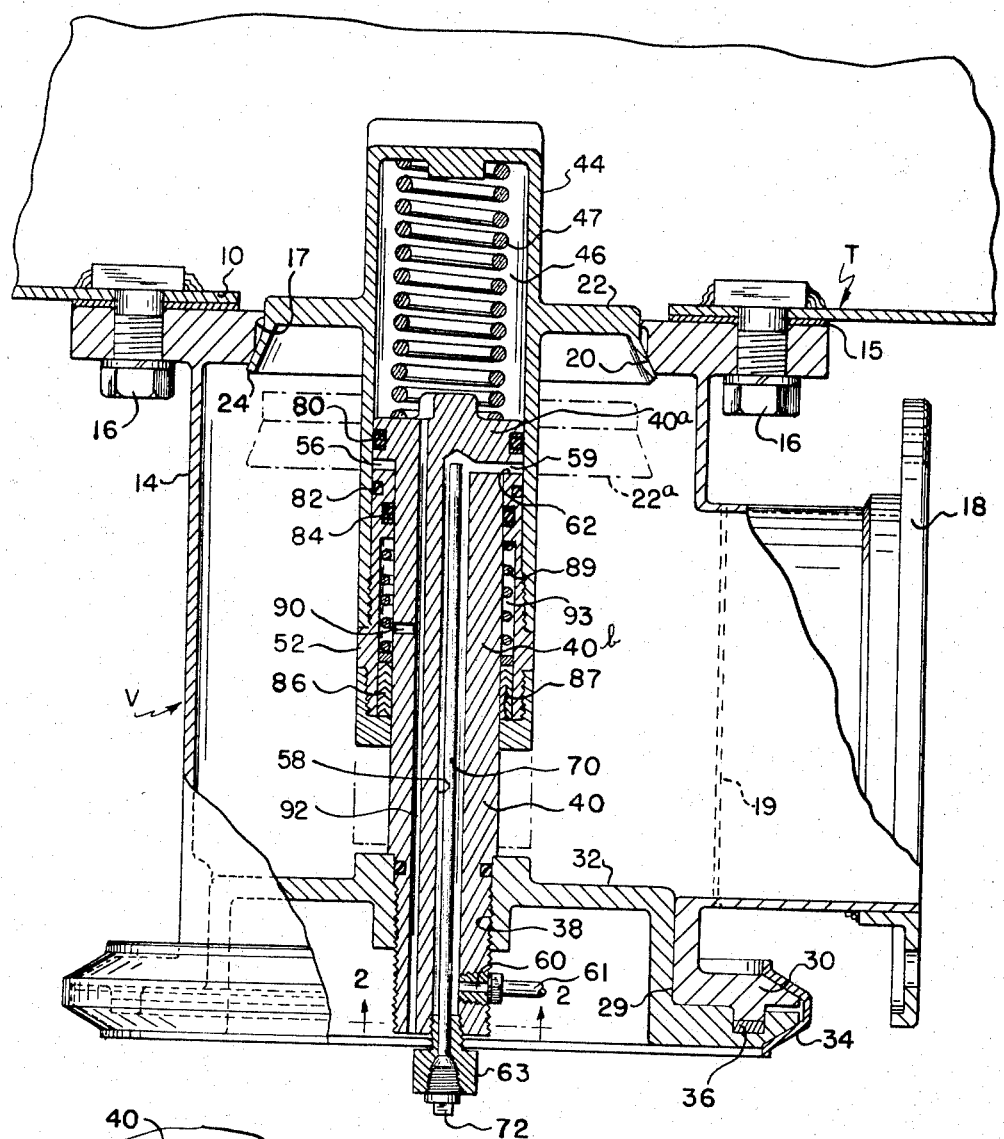
FIGURE 1 is a side elevational sectional view of a valve constructed in accordance with the invention mounted on the outlet opening of a liquid storage tank, and showing in dot-dash lines the valve disc in open position.
Figure 2:
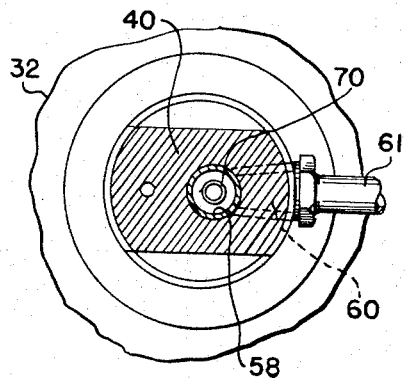
FIGURE 2 is a sectional view taken along the line 2—2 of FIGURE 1.

Although the invention is shown and described herein with reference to fluid storage tank discharge valves, it will be understood that it may be employed by any type of valve for controlling the flow of fluid.

Referring to the drawings, there is shown a fluid discharge control means of the invention in the form of the valve or valve means V detachably mounted to the outlet opening or port 10 of the liquid storage tank T. The valve V includes a valve housing 14 detachably secured to the tank by any suitable means such as the bolts 16 and containing a gasket 15 therebetween. The valve housing 14 is hollow and forms a through passageway having an inlet opening 17 contiguous with and forming a part of the opening 10, and having the outlet 18. The outlet 18 may have a shear section 19. The contiguous openings 10 and 17 are provided with a peripheral outwardly facing valve seat 20 for receiving a coacting valve disc 22 having a skirt 24 which selectively engages the seat 20 to close the tank outlet opening 10. Means are provided for selectively moving the valve disc 22 to and away from the valve seat 20 as will now be described.

The housing 14 contains a lower opening 29 encircled by the annular flange 30 which is adapted for receiving the upstanding base 32, such parts being detachably secured together by a quick-clamping split ring 34. A gasket 36 is interposed between the flange 30 and the base 32 to prevent the stored fluid product from the tank T from flowing therebetween. The base 32 contains a threaded aperture 38 for threadedly receiving the upstanding stationary piston 40 which extends toward the tank outlet port 10. Slidably disposed on the piston 40 is a coacting cylinder 44, closed at its top end, and adapted for longitudinal movement on the piston to and away from the port 10. The valve disc 22 is secured to and forms a part of the cylinder 44, and functions to control the flow of fluid past the valve seat 20, such disc being shown in a closed position in FIG. 1, with its open position indicated by 22a being shown in dot-dash lines therein.

Disposed interiorly of the cylinder in the chamber 46 between the top end of the cylinder 44 and the top of the piston 40 is a suitable bias means in the form of the compressed coil spring 47 for biasing the valve disc 22 to a normally-closed (or "fail-safe") position against the valve seat 20. The valve disc 22 is moved downwardly against the action of the spring 47 by an actuating means in the form of a hydraulic control system, now to be described.

The stationary piston 40 contains an upper or head portion 40a and a lower portion 40b of restricted diameter spaced from the adjacent cylinder wall. An inner sleeve 52 is threadedly secured to the lower portion of the cylinder and is disposed in the space between the inner longitudinal wall of the cylinder and the outer longitudinal wall of the piston restricted portion 40b. An annular cavity 56 is formed between the piston portions 40a and 40b. The piston lower portion 40b contains a longitudinal bore 58 connecting with the cavity 56 through the passageway 59. The lower end of the bore 58 connects with a port 60 having the coupling 61, which is connected to a suitable associated source of pressurized hydraulic fluid. The upper end of the sleeve 52 contains a shoulder 62 disposed in the cavity 56. The extreme bottom end of the bore 58 is closed by the plug 63.

In operation, pressurized hydraulic fluid enters the port 60, flows up the bore 58, thence through the passage 59 to the cavity 56 where it acts on the shoulder 62 to force the cylinder 44 downwardly to unseat the valve disc 22 from the seat 20.

For purposes of cleaning and repair, the valve may be removed exteriorly of the tank T simply by detaching the split ring 34 and thence removing such valve downwardly through the housing opening 29.

The bore 58 contains an open-ended standpipe 70 having its open upper end in the passage 59 (which forms part of the cavity 56) and spaced from the upper end thereof, with the lower end of the standpipe entering the plug 63 and being closed by a detachable plug 72 threaded into the plug 63, such structure permitting air to be removed from the hydraulic system.

Suitable fluid seal means are provided to prevent the flow of stored fluid from flowing between the piston and the cylinder and to prevent the flow of hydraulic fluid between the sleeve 52 and the piston. Specifically, an O-ring 80 is disposed between the piston upper portion 40a and the adjacent wall of the cylinder. An O-ring 82 is provided between the sleeve 52 and the cylinder 44. An O-ring 84 is provided between the sleeve 52 and the adjacent wall of the piston lower portion 40b. Additionally, a packing 86 is disposed on the cylinder shoulder 87 and retained tightly thereagainst by the compressed coiled spring 89.

A branch passage 90 connects with the passageway 92, which vents to the atmosphere, to allow any stored product which may bypass packing 86 and collect in cavity 93 to bleed to the atmosphere. Such structure also allows any hydraulic fluid which bypasses O-ring 84 and collects in cavity 93 to bleed to the atmosphere. Such passages 90 and 92 thus insure that there will be no intermingling of hydraulic fluid and the stored fluid.

The terms and expressions which have been employed are used as terms of description, and not of limitation, and there is no intention, in the use of such terms and expressions, of excluding any equivalents of the features shown or described, or portions thereof, but it is recognized that various modifications are possible within the scope of the invention claimed.

What is claimed is:

1. Fluid discharge control means for an outlet port of a fluid storage tank comprising, a valve seat formed contiguous with the outlet port and facing outwardly of the tank, valve means detachably secured to the exterior of the tank and including a valve disc selectively engageable with said seat from the exterior of the tank whereby the disc closes the port against the flow of stored fluid flowing therethrough, means for selectively moving said disc to and away from the valve seat to open and close the port, means for detachably securing said valve means to the tank exterior, said valve means including a housing forming a passageway having an outlet and having an inlet contiguous with said tank outlet port to form a part thereof, an upstanding stationary piston secured to said housing and extending toward said tank outlet port, a cylinder operatively disposed on said piston in coacting relation therewith whereby the cylinder is longitudinally movable on the piston toward and away from said tank outlet port, said valve disc being secured to said cylinder whereby said longitudinal movement of the cylinder on the piston causes the valve disc to selectively engage said valve seat to control fluid flow through the tank outlet port, the lower portion of the piston having a restricted diameter and an inner sleeve is secured to the cylinder lower inner longitudinal wall and in sliding sealing contact with the piston, there being a cavity formed between the piston upper portion and the lower portion thereof having the restricted diameter, the upper end of the sleeve forming a shoulder disposed in the cavity, and said means for moving the disc including pressurized hydraulic fluid in said cavity and acting on said sleeve shoulder to force the cylinder downwardly against the action of said bias means.

2. The structure of claim 1 wherein said piston contains a longitudinal bore terminating at its inner upper end in said cavity containing said sleeve shoulder, the lower end of said bore being connected to an associated source of pressurized hydraulic fluid for feeding such hydraulic fluid through the bore and into the cavity and thence acting on said shoulder to force the cylinder downwardly.

3. The structure of claim 2 wherein an open-ended standpipe is disposed in said piston bore, the upper end of the standpipe being spaced from the upper end of the cavity, the lower end of the standpipe being closed by a detachable plug which may be selectively removed to remove air from the bore and cavity inadvertently contained therein.

4. The structure of claim 1 wherein fluid seal means is disposed between said piston and said cylinder to prevent the flow of stored fluid therebetween and wherein fluid seal means is disposed between said sleeve and said piston to prevent the flow of pressurized hydraulic fluid therebetween.

5. Fluid discharge control means for an outlet port of a fluid storage tank comprising, a valve seat formed contiguous with the outlet port and facing outwardly of the tank, valve means detachably secured to the exterior of the tank and including a valve disc selectively engageable with said seat from the exterior of the tank whereby the disc closes the port against the flow of stored fluid flowing therethrough, means for selectively moving said disc to and away from the valve seat to open and close the port, and means for detachably securing said valve means to the tank exterior, said valve means including a housing forming a passageway having an outlet and having an inlet contiguous with said tank outlet port to form a part thereof, an upstanding stationary piston secured to said housing and extending toward said tank outlet port, a cylinder operatively disposed on said piston in coacting relation therewith whereby the cylinder is longitudinally movable on the piston toward and away from said tank outlet port, said valve disc being secured to said cylinder whereby said longitudinal movement of the cylinder on the piston causes the valve disc to selectively engage said valve seat to control stored fluid flow through the tank outlet port, the top end of the cylinder being closed, a compressed coil spring being disposed interiorly of the cylinder in the chamber formed between said top end of the cylinder and the top end of the piston to maintain the valve disc in a normally-closed position against said valve seat, the lower portion of the cylinder having a restricted diameter and containing an inner sleeve secured to the piston lower inner longitudinal wall and in sliding sealing contact with the piston, there being a cavity formed between the piston upper portion and the lower portion thereof having the restricted diameter, the upper end of the sleeve forming a shoulder disposed in the cavity, said means for moving the disc including pressurized hydraulic fluid in said cavity acting on said sleeve shoulder to force the cylinder downwardly against the action of said spring, said piston containing a longitudinal bore terminating at its inner upper end in a cavity, the lower end of said bore being connected to an associated source of pressurized hydraulic fluid for feeding such hydraulic fluid through the bore and into the cavity and thence acting on said shoulder to force the cylinder downwardly, and open-ended standpipe disposed in said piston bore, the upper end of the standpipe being spaced from the upper end of the cavity, the lower end of the standpipe being closed by a detachable plug which may be selectively detached to remove air from the bore and cavity inadvertently contained therein, fluid seal means disposed between said piston and said cylinder to prevent the flow of stored fluid therebetween, and fluid seal means disposed between said sleeve and said piston to prevent the flow of pressurized hydraulic fluid therebetween.

References Cited

UNITED STATES PATENTS

| | | | |
|---|---|---|---|
| 2,019,786 | 11/1935 | Jurs | 251—63.6 |
| 2,382,562 | 8/1945 | Harvey | 251—63.5 X |
| 2,741,262 | 4/1956 | Crookston | 137—529 X |
| 2,759,699 | 8/1956 | Rush | 251—63.5 X |
| 3,240,224 | 3/1966 | Horl et al. | 251—144 X |

ARNOLD ROSENTHAL, *Primary Examiner.*

U.S. Cl. X.R.

251—144